Dec. 23, 1958  F. STASTNY  2,865,800
PROCESS OF FORMING SHAPED ARTICLES OF POROUS STYRENE
POLYMERS HAVING IMPACT-RESISTANT SURFACES
Filed Nov. 9, 1955

INVENTOR:
FRITZ STASTNY
BY Marzall, Johnston, Cook & Root
ATT'YS

United States Patent Office 2,865,800
Patented Dec. 23, 1958

2,865,800

PROCESS OF FORMING SHAPED ARTICLES OF POROUS STYRENE POLYMERS HAVING IMPACT-RESISTANT SURFACES

Fritz Stastny, Weinheim an der Bergstrasse, Germany, assignor to Badische Anilin- & Soda-Fabrik Aktiengesellschaft, Ludwigshafen (Rhine), Germany Application November 9, 1955, Serial No. 545,846

Claims priority, application Germany November 11, 1954

8 Claims. (Cl. 154—110)

This invention relates to shaped articles of porous, cellular styrene polymers having impact-resistant surfaces and a method for the production of such shaped articles.

Porous shaped articles of plastics, in particular styrene polymers, have been introduced into industry in an ever increasing degree. They have many possibilities of use, as for example as insulating materials, floats, crash helmets or as building elements. For many purposes, however, the surface of the porous plastic article is not sufficiently strong.

It is therefore an object of the present invention to provide shaped articles consisting of porous, cellular styrene polymers of which the surface is provided with an impact-resistant layer.

Another object is to provide porous shaped articles of styrene polymers which are provided with an impact-resistant surface of a copolymer of an unsaturated polyester resin with a vinyl compound.

A still other object of the invention is to provide a method for the production of shaped articles of styrene polymers having an impact-resistant surface.

Further objects of the invention will become evident from the following more detailed description of the invention.

These objects are achieved in conformity with the detailed description of the invention and the accompanying drawings.

Figure 1 of the drawings shows a plate of a porous styrene polymer the upper side of which has been provided with a copolymer of an unsaturated polyester resin and a vinyl compound which is liquid at room temperature, as for example styrene.

Figure 1:
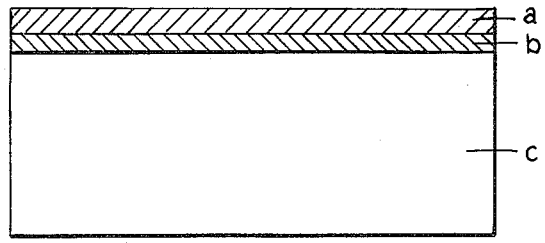

The shaped articles according to this invention consist substantially, i. e. to the extent of at least about 51% of their volume, of a porous, cellular styrene polymer and have a surface reinforcement of a copolymer of an unsaturated polyester resin and a vinyl compound liquid at room temperature. Between the surface reinforcement of the said copolymer and the porous cellular styrene polymer which forms the bulk of the volume of the shaped article, there is arranged a layer of a porous styrene polymer of higher density. Such shaped articles are prepared according to this invention from porous cellular individual particles of a styrene polymer which are still capable of expansion and hereinafter called "pre-expanded particles," compact individual particles of a styrene polymer which contain a readily volatile organic liquid which does not dissolve the styrene polymer, hereinafter called "particles containing raising agent," and a mixture of unsaturated polyester resin with a vinyl compound liquid at room temperature. Other substances may be co-employed in the production of the shaped articles but their presence in the porous shaped articles is not essential.

In order to prepare the shaped articles of porous styrene polymers with impact-resistant surfaces according to this invention, the contents of a mold which closes in a non-gastight manner are heated to temperatures above the softening range of the styrene polymer present in the mold. The inner surface of the mold is partly covered with a layer of a partly polymerized mixture of an unsaturated polyester resin and a vinyl compound liquid at room temperature. Onto the layer of this mixture there is applied a further layer of particles of a styrene polymer containing raising agent. The remaining volume of the mold is filled with pre-expanded, porous, cellular particles of a styrene polymer which are still capable of expansion. During the heating both the pre-expanded particles and the particles containing raising agent expand and unite together and with the layer of the mixture of the unsaturated polyester resin and the vinyl compound which is at the same time copolymerized and thereby hardened.

To carry out the invention in practice, a part of the inner surface of a mold capable of being closed in a manner which is not gastight is covered with a mixture of an unsaturated polyester resin and a vinyl compound liquid at room temperature in which the polyester resin is soluble, then there is applied onto the layer of this mixture a layer, closed as far as possible, of individual particles containing raising agent. The mixture of unsaturated polyester resin and vinyl compound is allowed to polymerize partly, i. e. to polymerize to such an extent that it is no longer sticky, and then the remainder of the mold is filled with pre-expanded particles and the contents of the mold are heated to temperatures above the softening point of the styrene polymer. Thereby there occurs an expansion of the particles containing raising agent and also of the pre-expanded particles of the styrene polymer which leads to the formation of an excess pressure in the mold so that the pre-expanded particles and the particles containing raising agent soften and sinter together and also at the same time unite with the surface layer of the mixture of unsaturated polyester and vinyl compound. Moreover during the heating to temperatures above the softening range of the styrene polymer, the mixture of unsaturated polyester resin and vinyl compound polymerizes extensively or completely and forms a hard surface layer on the porous shaped article. After cooling, the shaped article is removed from the mold and can be used for any appropriate purpose.

According to another embodiment of the invention, the particles containing raising agent are applied to a layer of a mixture of unsaturated polyester resin and vinyl compound after the said mixture is partly polymerized. The mold is then filled with the preexpanded particles of a styrene polymer, and the contents of the mold heated so as to expand the styrene polymers while simultaneously polymerizing the partly polymerized mixture of unsaturated polyester resin and vinyl compound to form a hard and impact-resistant surface.

The particular action of the method of the invention may be seen in the fact that the intermediate layer of the particles containing raising agent protects the porous pre-expanded particles from the attack of the mixture of unsaturated polyester resin and vinyl compound, because without the presence of this intermediate layer the pre-expanded particles would be dissolved by the said mixture so that no firmly adherent union between the compact surface layer and the porous material is formed. This action of the intermediate layer of particles containing raising agent is very surprising because these particles also consist of a styrene polymer which is similarly soluble in the mixture of unsaturated polyester resin and vinyl compound. It is preferable to use for the particles containing raising agent and for the pre-expanded particles the same styrene polymer.

Styrene polymers in the sense of the present specification are homopolymers and copolymers of styrene which contain at least 80% of a styrene, such as styrene itself, alpha-methylstyrene, nuclear-methylated styrenes or a chlorostyrene. Copolymers of these styrenes with each other or with other monovinyl compounds, such as acrylonitrile, N-vinylcarbazole or acrylic acid esters, can be used.

The particles containing raising agents should as a rule have a particle size between 0.2 and 3 millimeters and contain as raising agent about 3 to 15% by weight (with reference to the total weight of the particles) of a non-solvent readily volatile organic liquid with a boiling point or boiling range between 30° and 70° C. Such raising agents are in particular readily volatile aliphatic and cycloaliphatic hydrocarbons, such as pentane, hexane, heptane, cyclohexane, cylopentadiene or mixtures of these hydrocarbons. These particles containing raising agent can be prepared by polymerization of the monomers formers the styrene polymers in the presence of the said raising agents, for example by the bead polymerization method. Finely divided styrene polymers free from raising agent can, however, also be prepared and impregnated with the raising agents, the liquid agent thus being introduced into the styrene polymer after polymerization.

Pre-expanded particles are obtained by heating particles containing raising agent to temperatures above the softening point of the styrene polymer and above the boiling point of the liquid raising agent contained therein. The particles containing raising agent are preferably heated only for such a period that the liquid raising agent contained therein is not completely evaporated. There are thus formed porous cellular individual particles which are still capable of expansion. These pre-expanded particles can be prepared for example by heating the particles containing raising agent in hot water, with steam or with infra-red radiation. In the case of polystyrene it is preferable to introduce the particles containing raising agent for about 3 to 10 minutes into hot water at a temperature of between 75° and 100° C. When styrene polymers are used which have a high softening point, as for example copolymers of styrene and N-vinylcarbazole, temperatures of between 100° and 120° C. can be used for the pre-expansion. The pre-expanded particles as a rule have a bulk density between about 15 and 200 grams per liter. Since the expendibility of such pre-expanded particles increases somewhat by storage before the second expansion, it is preferable to store the pre-expanded particles at room temperature for a period from a day to about 3 weeks.

More detailed information regarding the pre-expansion or incomplete foaming up of the particles containing raising agent is given in the copending application Serial No. 344,473 of March 24, 1953, now Patent No. 2,787,809, issued April 9, 1957.

The polymerizable mixtures of unsaturated polyester resins and a liquid vinyl compound to be used according to this invention for the production of the impact-resistant surface layer are known commercial products which as a rule contain about 60 to 80% of the unsaturated polyester resin and 40 to 20% of a vinyl compound liquid at room temperature.

The unsaturated polyester resins are preferably prepared from unsaturated dicarboxylic acids, if desired with the addition of saturated or aromatic dicarboxylic acids, and dihydric alcohols. They contain in the chain the repetitive grouping

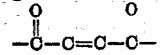

and in consequence are copolymerizable with vinyl compounds. As examples of alpha-olefine-alpha-beta-dicarboxylic acids which can be used for the preparation of these unsaturated polyester resins there may be mentioned maleic acid, fumaric acid, chlor-maleic acid, chlor-fumaric acid and citraconic acid. Other dicarboxylic acids which may be contained in the polyester resins are for example succinic acid, adipic acid and phthalic acid. Suitable dihydric alcohols are ethylene glycol, di-, tri- and tetra-ethylene glycol, propylene glycol and butylene glycol.

The copolymerization of these mixtures is initiated by radical-forming catalysts, in particular organic peroxides, such as benzoyl peroxide, lauroyl peroxide, tertiary butyl peroxide and cyclohexanone peroxide. There may also be added to these polyester resins as polymerization activators, metal salts which are soluble in organic solvents, as for example the napthenates of iron, cobalt and manganese. Other suitable polymerization activators are secondary and tertiary amines.

The unsaturated polyester resins should preferably be prepared from equimolecular amounts of dicarboxylic acids and glycols and have acid numbers between 30 and 60. For the process according to this invention it is preferable for the mixtures of unsaturated polyester resins and vinyl compounds to have a high viscosity, i. e. to constitute a pasty mass which is still capable of being spread at room temperature. Such highly viscous mixtures are obtained by adding to the unsaturated polyester resin and the vinyl compound liquid at room temperature, fillers, as for example finely divided silicon dioxide or aluminum dioxide. Other thickening agents may, however, also be used.

The additives for initiating the polymerization, i. e. the catalyst and the activator, are preferably not added until shortly prior to the application of the mixture to be polymerized to the inner wall of the mold.

An essential feature of the molds which are used for carrying out the process is that they must be capable of being closed in a non-gastight manner and must permit a direct contact of the heating medium with the material to be expanded. It is preferable to use molds which contain perforations through which liquid, gaseous or vaporous heating media can be introduced into the interior of the mold. The inside of the mold can be coated directly with the mixture of the unsaturated polyester resin and a liquid vinyl compound; it is also possible, however, and often preferable to introduce into the mold insertions, as for example plates, to which the unsaturated polyester resin and the vinyl compound has been applied. In order to facilitate the loosening of the final shaped article from the wall of the mold or the insertions which have been introduced into the mold, it has been found advisable to apply to the surface of the mold or of the insertion, a mold separating agent, such as a silicone or polyethylene oxide.

In order to effect initial polymerization of the catalyst-containing mixture of unsaturated polyester resin and vinyl compound, this mixture can be allowed to stand at room temperature, for example for 10 to 40 minutes; it is also possible, however, in order to shorten the working time of this mixture, to heat it for a shorter time, for example 5 minutes, at higher temperature, as for example 70° C. Before the heating of the mold takes place for the production of the shaped article, the polymerization should preferably have progressed to such an extent that the mixture of unsaturated polyester resin and vinyl compound is no longer sticky at room temperature.

As a rule the shaped articles according to this invention should have an impact resistant layer of 0.5 to 5 millimeters thickness of the copolymer of the unsaturated polyester resin and the vinyl compound. The intermediate layer, which is formed by the particles containing raising agent, has a thickness of between about 0.4 and 5 millimeters after expansion. To this there corresponds an intermediate layer of non-expanded particles containing raising agent of about 0.2 to 3 millimeters.

For heating during the expansion in the mold, temperatures between 95° and 115° C. have proved especially suitable. The most favorable temperature depends on the softening range of the styrene polymer in question. In any case heating must be to such an extent that the styrene polymer in question is plastic so that it can be expanded by the evaporating liquid raising agent.

In Figure 1 of the drawings, $a$ is an impact-resistant surface layer formed of a copolymer of an unsaturated polyester resin and a vinyl compound. $b$ is the intermediate layer of porous cellular styrene polymer of high specific gravity which has been formed by expansion of particles containing raising agent, and $c$ is the main portion of the porous plate formed of pre-expanded particles.

Figure 2:
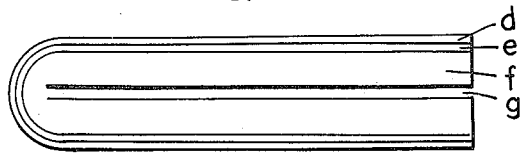
Figure 2 shows a longitudinal section through a cylindrical shaped article of a porous styrene polymer the surface of which has an impact-resistant reinforcement.

Figure 2 shows a longitudinal section through a cylindrical shaped article. $d$ is the impact-resistant surface layer, $e$ is the porous intermediate layer of high specific gravity and $f$ is the porous portion of lower specific gravity. $g$ is a metal tube which is perforated and through which steam is blown into the mold. This tube remains in the porous shaped article.

Figure 3:
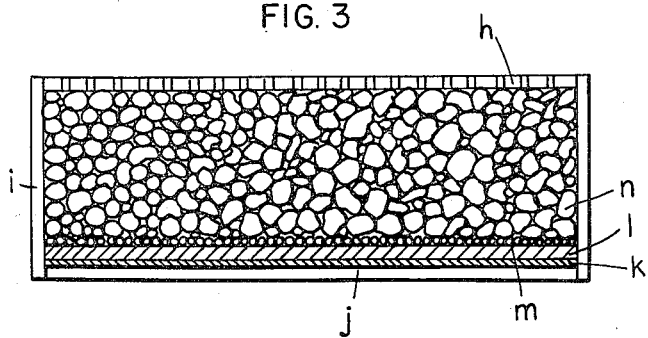
Figure 3 shows diagrammatically a section through a mold in which the porous shaped articles reinforced at the surface according to this invention can be made.

In Figure 3 there is shown a section in the vertical plane through a mold, the condition of the filled, closed mold before expansion being shown. $h$ is the perforated mold cover, $i$ a non-perforated mold jacket, and $j$ is the non-perforated bottom of the mold. $k$ is a metal plate polished to high gloss which is coated with the mixture of unsaturated polyester resin and vinyl compound $l$. $m$ is a layer of particles containing raising agent, and $n$ are the pre-expanded particles.

In the description of the present invention it has been stated that the surface of the shaped articles should only partly be covered with the impact-resistant copolymer of unsaturated polyester resin and vinyl compound. By this it is meant to be understood that as a rule about 5 to 90% of the surface of the shaped article has this impact-resistant reinforcement.

The specific gravities of the parts of the shaped body which consists of porous cellular styrene polymer can be varied within wide limits. Those parts which are formed of pre-expanded material as a rule have specific gravities of 0.015 to 0.1. It is difficult to give a statement as to the specific gravity of the porous intermediate layer which is formed of particles containing raising agent because this layer is so firmly united with the impact-resistant copolymer and the porous styrene polymer of low specific gravity that it is destroyed when attempts are made to separate them. It is quite clear, however, that this intermediate layer has a specific gravity which is higher than that of the material formed from the pre-expanded particles and lower than that of a non-porous styrene polymer. Also the hardness of the intermediate layer is greater than that of the porous styrene polymer which has been formed from the pre-expanded particles.

The following examples will serve further to explain the invention but the invention is not in any way limited to these examples.

*Example 1*

A three-part metal mold, as shown in Figure 3, is used for the production of a shaped article in the form of a plate. A layer, 1.5 millimeters thick, of a highly viscous mixture of styrene and of an unsaturated polyester resin on the basis of maleic acid, adipic acid, ethylene glycol and diethylene glycol of the acid number 45 which has been thickened by the addition of finely divided silicon dioxide and colored brown by iron oxide is applied to a highly polished metal plate having dimensions corresponding to the base plate of the mold.

The polymerizable mixture contains the unsaturated polyester resin and the styrene in the ratio 7:3. The polymerization is initiated by the addition of 0.5% of cyclohexanone peroxide and 0.01% of cobalt naphthenate. The metal plate coated with the polymerizable mixture is kept for 15 minutes at 60° C., the mixture thereby being initially polymerized to such an extent that it has become tough-elastic and no longer sticks upon contact with the fingers. The metal plate is then introduced into the mold with the coated side uppermost, finely-particled bead-shaped polystyrene (bead diameter about 0.5 millimeter) which contains 5% of pentane in homogeneous dispersion is strewed onto the inserted coated plate so that a closed layer of these beads is formed, and the hollow space of the mold is completely filled with pre-expanded finely-particled polystyrene of the bulk density 65 grams per liter. The mold is closed and kept for 15 minutes in water at 100° C.

After cooling the closed mold, a shaped article is obtained consisting of porous polystyrene with an impact-resistant outer layer.

These pre-expanded polystyrene particles were prepared by pre-expanding the pentane-containing polystyrene beads for about one minute and a half in hot water having a temperature of 90° C.

In this way it is possible to prepare a great variety of shaped articles, as for example plates, floats for fishing nets, parts of show window figures, dolls, packing containers, refrigerator doors, cooling containers and the like.

*Example 2*

On the bottom of a three-part perforated metal mold there is laid a metal plate which corresponds in size to the base of the mold. The upper side of the metal plate is coated with a layer 1 millimeter thick of the mixture of unsaturated polyester resin and styrene specified in Example 1. Then a fabric of glass fibers is laid on the polymerizable mixture and a further layer 1 millimeter thick of the polymerizable mixture applied thereon. The mixture of unsaturated polyester resin and styrene is then sprinkled with polystyrene beads containing 5% of pentane so that a closed layer of these beads 1 millimeter thick is formed. The mold is then kept for 20 minutes at 50° C. and then the remaining volume of the mold is filled with pre-expanded polystyrene particles (prepared by pre-expanding the pentane-containing polystyrene) which are still capable of expansion and have a bulk density of 35 grams per liter. The mold is then closed, steam at 110° C. is led in for 30 seconds and then allowed to cool. A shaped article is obtained the base surface of which has an impact-resistant layer.

I claim:

1. A method of manufacturing a shaped molded article of a porous cellular styrene polymer which comprises: partially covering the inner surface of a gas-permeable mold enclosing a volume of the desired shape with a layer (A) of a mixture of an unsaturated polyester resin and a vinyl compound liquid at room temperature; then covering said layer (A) with a second layer (B) of compact expandable particles of a styrene polymer containing a readily volatile non-solvent organic liquid as a raising agent, and initially partly polymerizing said unsaturated polyester resin and said vinyl compound in said layer (A), and in any order; subsequently filling the remaining volume of the mold with (C) pre-expanded porous cellular particles of a styrene polymer capable of additional expansion; and heating the contents of the mold at a temperature above the softening range of both the expandable compact and pre-expanded particles of styrene polymers whereby said styrene polymers are expanded to exert interacting pressure within said mold and are firmly united with each other and said layer (B) is firmly united with said layer (A) in which the mixture of unsaturated polyester resin and vinyl compound is simultaneously polymerized and hardened to form an impact-resistant surface upon the molded article.

2. A method according to claim 1 wherein the contents of the mold are heated by a water-containing heating medium which comes into direct contact with the contents of the mold which are to be expanded.

3. A method as claimed in claim 1 wherein the layer of mixture of unsaturated polyester resin and vinyl compound is applied to a loose plate which is then inserted into the mold.

4. A method as claimed in claim 1 wherein the compact expandable particles of a styrene polymer in layer (B) have a particle size of between about 0.2 and 3 millimeters and the pre-expanded porous cellular particles of a styrene polymer have a bulk density of between about 15 and 200 grams per liter.

5. A method as claimed in claim 4 wherein layer (A) is selected to provide a thickness in the molded article of 0.5 to 5 millimeters, layer (B) is selected to provide a thickness in the molded article of between about 0.4 and 5 millimeters, and at least about 51% of the total volume of the molded article consists of an expanded porous cellular styrene polymer having a density lower than that of the styrene polymer of layer (B).

6. A method as claimed in claim 1 wherein layer (A) contains as a polymerizable mixture about 60 to 80% of the unsaturated polyester resin and about 40 to 20% of the vinyl compound.

7. A method as claimed in claim 6 wherein the vinyl compound is styrene.

8. A method of manufacturing a shaped molded article of a porous cellular styrene polymer which comprises: partially covering the inner surface of a gas-permeable mold enclosing a volume of the desired shape with a viscous layer (A) of a mixture containing as polymerizable components about 60 to 80% of an unsaturated polyester resin and about 40 to 20% of styrene which is liquid at room temperature; then covering said layer (A) with a second layer (B) of compact expandable particles of a styrene polymer having a particle size of between about 0.2 and 3 millimeters and containing as a raising agent from 3 to 15% of a readily volatile non-solvent organic liquid, and initially partly polymerizing said unsaturated polyester resin and styrene in said layer (A), and in any order; subsequently filling the remaining volume of the mold with (C) pre-expanded porous cellular particles of a styrene polymer having a bulk density of between about 15 and 200 grams per liter and being capable of additional expansion; and heating the contents of the mold by direct contact with a non-solvent hot fluid heating medium at a temperature above the softening range of both the expandable compact and pre-expanded styrene polymers whereby said styrene polymers are expanded to exert interacting pressure within said mold and are firmly united with each other and said layer (B) is firmly united with said layer (A) in which the mixture of unsaturated polyester resin and styrene is simultaneously polymerized and hardened to form an impact-resistant surface upon the molded article.

References Cited in the file of this patent

UNITED STATES PATENTS

| | | |
|---|---|---|
| 2,639,252 | Simon et al. | May 19, 1953 |
| 2,690,987 | Jeffries et al. | Oct. 5, 1954 |
| 2,737,503 | Sprague et al. | Mar. 6, 1956 |
| 2,744,291 | Stastny et al. | May 8, 1956 |
| 2,753,642 | Sullivan | July 10, 1956 |
| 2,767,436 | Noland et al. | Oct. 23, 1956 |
| 2,770,406 | Lane | Nov. 13, 1956 |
| 2,773,792 | Nebesar | Dec. 11, 1956 |

OTHER REFERENCES

"Foaming-Agent Impregnated Polystyrene Beads," Plastics World; March 1954, page 4.

UNITED STATES PATENT OFFICE
CERTIFICATE OF CORRECTION

Patent No. 2,865,800                        December 23, 1958

Fritz Stastny

It is hereby certified that error appears in the printed specification of the above numbered patent requiring correction and that the said Letters Patent should read as corrected below.

Column 3, line 12, after "can" insert -- also --; line 29, for "liquid agent" read -- liquid raising agent --; lines 73 to 75, the formula should appear as shown below instead of as in the patent:

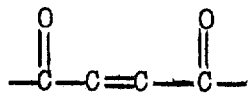

Signed and sealed this 12th day of May 1959.

(SEAL)
Attest:

KARL H. AXLINE
Attesting Officer

ROBERT C. WATSON
Commissioner of Patents